United States Patent

[11] 3,577,774

| [72] | Inventors | Robert W. Steffens<br>Richland;<br>Milton F. Zeutschel, Bellevue, Wash. |
|---|---|---|
| [21] | Appl. No. | 801,389 |
| [22] | Filed | Feb. 24, 1969 |
| [45] | Patented | May 4, 1971 |
| [73] | Assignee | The United States of America as represented by the United States Atomic Energy Commission |

[54] ELECTROSTATIC ULTRASONIC NONDESTRUCTIVE TESTING DEVICE
1 Claim, 5 Drawing Figs.

[52] U.S. Cl. .................................................. 73/67.8, 73/71.5
[51] Int. Cl. .................................................. G01n 29/00
[50] Field of Search .................................................. 73/67.5, 67.9, 71.5

[56] References Cited
UNITED STATES PATENTS
2,534,006  12/1950  DeLano, Jr. et al. ......... 73/67.5

OTHER REFERENCES

An article entitled " A Review of Supersonic Methods for Measuring Elastic and Dissipative Properties of Solids" by S. Siegel from " The Journal of the Acoustical Society of America," July 1944, pages 26 and 27.

An article entitled " Generalisation Dune Methode Electrostatique Pour La Mesure Ultrasonore Des Constantes Elastiques et anelastiques Des Solides" by Bordoni et al. from " Acustica," Vol. 4, 1954, pp. 184-187.

*Primary Examiner*—James J. Gill
*Attorney*—Roland A. Anderson

ABSTRACT: An ultrasonic device for nondestructively testing an electrically conductive sample comprises an electrode mounted to said sample and electrically insulated therefrom. Means are provided for generating a pulsed potential difference between the sample and the electrode to generate an elastic wave in the sample. A bias voltage is applied to the electrode and an oscilloscope is used to detect, relative in time to the applied pulsed potential difference of the electrode, changes in the bias potential of the electrode response to the elastic wave.

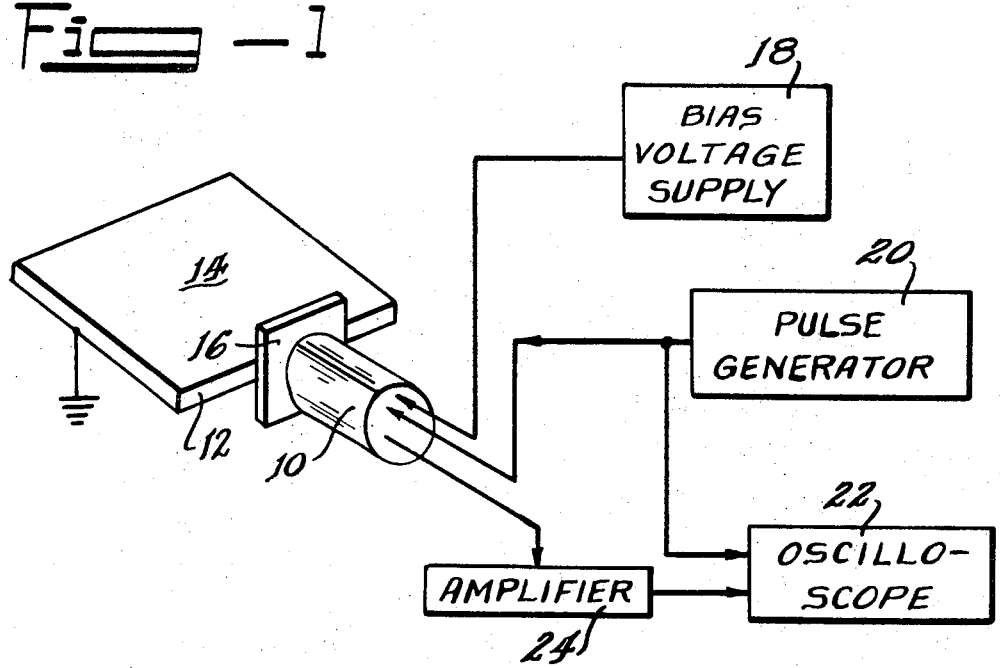
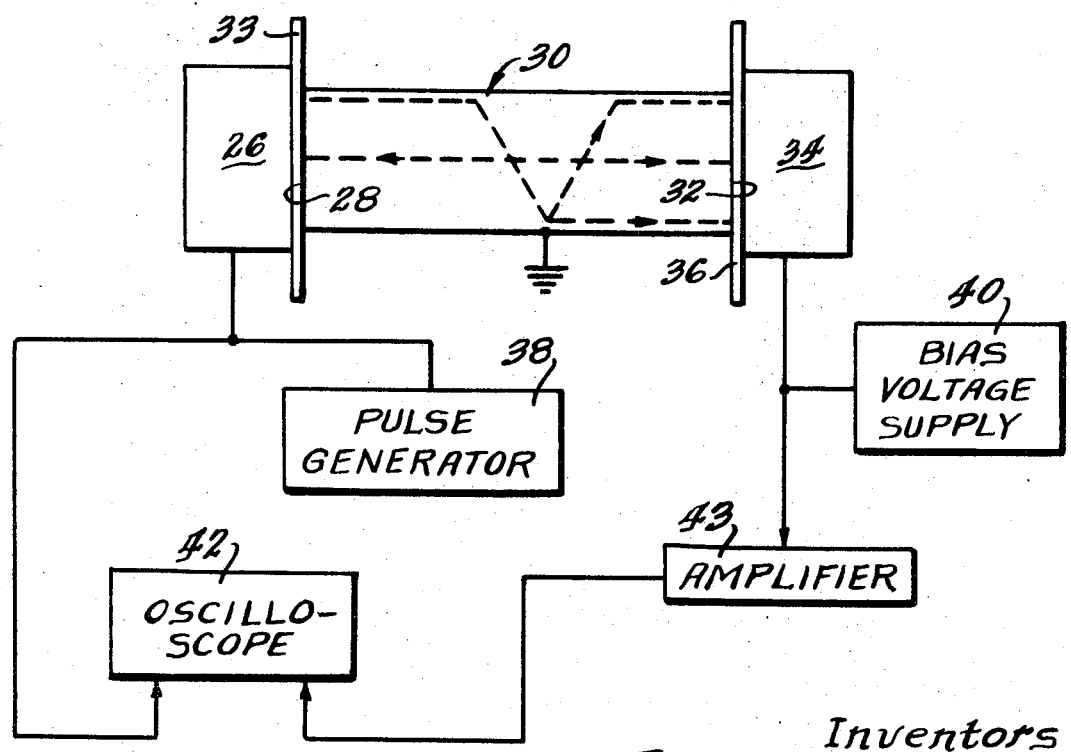

Inventors
Robert W. Steffens
Milton F. Zeutschel
Attorney

ELECTROSTATIC ULTRASONIC NONDESTRUCTIVE TESTING DEVICE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The present invention relates to ultrasonic devices for non-destructively testing a sample and more particularly to electrostatic ultrasonic devices for nondestructively testing electrically conductive samples.

Ultrasound provides a convenient and rapid tool for determining the physical properties of a sample without destroying the sample. Typical physical properties which may be measured are Young's modulus, shear modulus and Poisson's ratio. Using piezoelectric transducers to generate and detect elastic waves within the sample, the longitudinal and shear velocities of the elastic waves may be determined easily at room or slightly elevated temperatures to provide a measure of the desired physical properties. However, as the sample temperature becomes elevated, many problems are encountered, such as coupling the elastic waves from the transducer to the sample and the transducer curie temperature (the temperature at which the transducer loses its piezoelectric properties). Present piezoelectric transducers will not function in environments over 400° C. and the ultrasound from the transducer must be coupled to the sample by using a coupling medium.

It is therefore one object of the present invention to provide an improved ultrasonic device for nondestructively testing an electrically conductive sample.

It is another object of the present invention to provide an ultrasonic device for nondestructively testing an electrically conductive sample and which is capable of operating at elevated above 400° C.

It is another object of the present invention to provide an ultrasonic device which will generate and detect ultrasound within a sample at elevated temperatures above 400°C. without a coupling medium.

Other objects of the present invention will become apparent as the detailed description proceeds.

SUMMARY OF THE INVENTION

In general, the present ultrasonic device comprises an electrode mounted to an electrically conductive sample and electrically insulated therefrom. Means are provided for generating a pulsed potential difference between the sample and the electrode to generate an elastic wave in the sample and means are provided for detecting the propagation of this wave through the sample to provide a measure of the physical properties of the sample.

BRIEF DESCRIPTION OF THE DRAWINGS

Further understanding of the present invention may best be obtained from consideration of the accompanying drawings wherein:

FIG. 1 is a schematic diagram of an apparatus for the practice of the present invention.

FIG. 2 is a schematic diagram of an alternate apparatus for the practice of the present invention.

In FIG. 1, an electrode 10 is mounted adjacent a side 12 of an electrically conductive sample 14. A mica dielectric 16 operating as an electrical insulator is contact-mounted between the electrode 10 and the side 12. A power supply 18 applies a bias voltage to the electrode 10. A pulse generator 20 applies a high-voltage pulsed signal to the electrode 10. An oscilloscope 22 has its sweep trigger synchronized with the output pulses of the pulse generator 20 and its vertical input connected through an amplifier 24 to the electrode 10.

Figure 3:
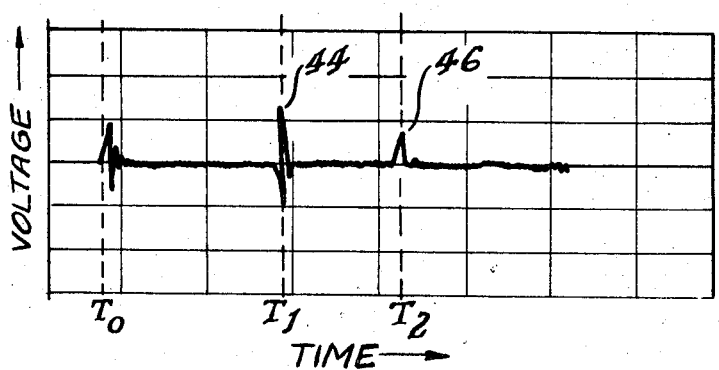
FIG. 3 is a typical waveform detected by the apparatus of FIG. 2.

In operation, with the sample 14 electrically grounded as shown, the high-voltage pulse applied to the electrode 10 generates a pulsed potential difference between the sample 14 and the electrode 10. This potential difference between the electrode 10 and the sample 14 creates a transient force of attraction between the electrode and the sample which, in turn, generates a pulsed elastic wave within the sample 14. The generated elastic wave travels along the length of the sample 14 and is reflected from the opposite side thereof back towards the side 12 of sample 14 adjacent electrode 10. When the reflected wave strikes the side 12 of the sample 14, it causes a small deflection thereof which instantaneously changes the bias potential present on the electrode 10 from the power supply 18. This instantaneous change in the bias potential on the electrode 10 is detected by vertical deflection of the presentation of oscilloscope 22 whose sweep is synchronized with each transmitted pulse from the generator 20. By measuring the time between transmitted and received pulses, the longitudinal velocity of ultrasound within the sample 14 may be calculated, as will be later appreciated.

To determine the shear velocity of ultrasound within the sample 14, it is necessary that the sample have two surfaces parallel to the direction of propagation of the elastic wave in the sample. Thus, as the longitudinal elastic wave generated by the applied pulsed potential difference propagates along the sample 14, refraction will occur at the parallel surfaces of the sample and shear waves which propagate across the sample are generated thereby. These shear waves will also be reflected and may be detected in the same aforementioned manner as the longitudinal waves and will appear a finite time after the reflected first longitudinal wave on the oscilloscope presentation. By measuring the transit time of the detected shear waves, the shear velocity of ultrasound in the sample 14 may be calculated, as will be later appreciated.

The embodiment illustrated in FIG. 1 and described above utilizes pulse-echo ultrasound techniques which are applicable for samples having only one surface available for inspection. Where two opposing surfaces of a sample are available, then the embodiment illustrated in FIG. 2 may be utilized.

In FIG. 2, an electrode 26 is mounted adjacent to a side 28 of an electrically conductive sample 30. A mica dielectric 33 acting as an electrical insulator is contact-mounted between the electrode 26 and the side 28. Adjacent the opposing side 32 of the sample 30 is mounted a second electrode 34. A second mica dielectric 36 acting as an electrical insulator is contact-mounted between the side 32 and electrode 34. A pulse generator 38 applies a pulsed voltage to the electrode 26. A power supply 40 applies a constant bias voltage to the electrode 34. An oscilloscope 42 has its sweep trigger synchronized with the pulse output of the pulse generator 38 and its vertical deflection input connected via amplifier 43 to the electrode 34.

In operation, with the sample 30 electrically grounded as shown, a high-voltage pulse from generator 38 applied to the electrode 26 generates a pulsed potential difference between the sample 30 and the electrode 26 to cause a transient force of attraction between the electrode 26 and the sample 30. This transient force of attraction generates a pulsed elastic wave which propagates along the sample 30 to the side 32. Upon reaching the side 32, the elastic wave strikes the side 32, causing a small deflection thereof which instantaneously changes the potential bias on the electrode 34. This instantaneous change in bias potential on the electrode 34 is detected by a deflection in the vertical presentation of the oscilloscope 42 whose sweep is synchronized with the transmitted pulses from generator 38. By measuring the time between transmitted and detected pulses, the longitudinal velocity of ultrasound within the sample 30 may be calculated.

As for the embodiment of FIG. 1, to measure the shear velocity of ultrasound within the sample 30, it is necessary that the sample 30 have two surfaces parallel to the direction of propagation of the ultrasound. With this construction, the propagating longitudinal wave will refract at the surface to generate shear waves which propagate across the sample 30. These generated shear waves will reach the side 32 of sample 30 after the longitudinal wave and are similarly detected to provide a measure of the shear velocity of ultrasound within the sample 30.

Figure 4:
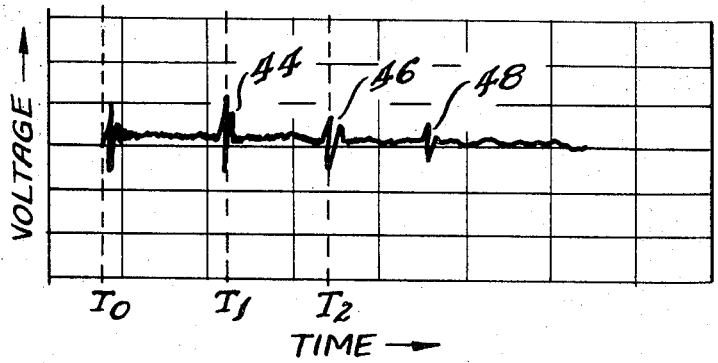
FIG. 4 is a typical waveform detected by the apparatus of FIG. 2.
Figure 5:
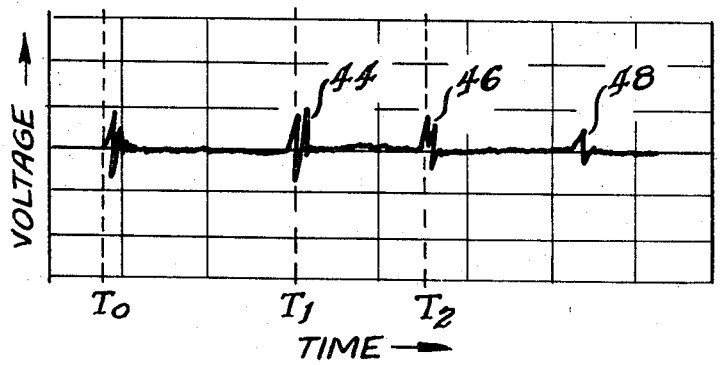
FIG. 5 is a typical waveform detected by the apparatus of FIG. 2.

Typical detected waveshapes for the practice of the present invention with the embodiment of FIG. 2 are shown in FIGS. 3, 4 and 5. FIG. 3 shows waveshapes obtained when pulsed elastic waves were sent through a ⅝-inch diameter stainless steel rod 3 inches long. FIGS. 4 and 5 show the waveshapes obtained for pulsed elastic waves transmitted through 0.675-inch diameter aluminum and brass rods, respectively, each 2 inches in length. The pulses 44 in FIGS. 3, 4 and 5 are the detected first longitudinal ultrasound waves. The pulses 46 are the detected first shear waves and the pulses 48 are the detected second shear waves.

The longitudinal and shear velocities of ultrasound propagation through the sample 30 may be calculated from the oscilloscope displays as follows. The longitudinal velocity of ultrasound is determined from the formula:

$$V_L = \frac{L}{T_1 - T_0}$$

where $V_L$ = longitudinal velocity of ultrasound in the sample,
L = the length of the sample through which the ultrasound passes,
$T_0$ = the time of application of the pulsed potential difference across the sample and the electrode, and
$T_1$ = the time of detection of the first received longitudinal wave.

The determination of the shear velocity of ultrasound within the sample 30 may be calculated from the formula:

$$V_T = \frac{V_L}{\sqrt{1 + \left(\frac{V_L(T_2 - T_1)}{D}\right)^2}}$$

where $V_L$ = the longitudinal velocity of ultrasound in the sample and may be determined by the above-described formula,
$T_2$ = the time of detection of the first received shear wave,
$T_1$ = the time of detection of the first received longitudinal wave, and
D = the diameter of the sample or the distance between the two parallel sides.

The above results for the samples of stainless steel, aluminum and brass were achieved with a 0.5-mil mica dielectric between the electrodes and the sample and a bias voltage of 75 volts with the sample at ground potential. The applied pulse was effected for a duration of 0.1 microsecond at an amplitude of 300 volts. Successful operation with the mica dielectric was effected at elevated temperatures up to 625° C. Operation at higher temperatures may be effected with other dielectrics, such as ceramics.

It was found that the operation of the present invention was improved where the dielectric was sized such that it minimized corona effects or electrostatic field fringing between the sample and the detecting and exciting electrodes. It will be appreciated that the aforedescribed operating values are not intended to be a limitation on the present invention but that other values may be substituted therefor.

Persons skilled in the art will, of course, readily adapt the general teachings of the invention to embodiments far different from the embodiments illustrated. Accordingly, the scope of the protection afforded the invention should not be limited to the particular embodiment illustrated in the drawings and described above but should be determined only in accordance with the appended claims.

We claim:
1. An ultrasonic device for nondestructively testing an electrically conductive sample comprising an electrode mounted adjacent one side of said sample, a dielectric material contact mounted between said electrode and said side of said sample and sized greater than said electrode to inhibit electrostatic-field fringing between said sample and said electrode, means for generating a pulsed potential difference between said sample and said electrode to generate a pulsed elastic wave in said sample, means for applying a bias voltage to said electrode, and means for detecting relative in time to said applied pulsed potential difference changes in the bias potential of said electrode responsive to said elastic wave to provide a measure of the physical properties of said sample.